Slater & Pratt,
Harness Hames.
No. 3,754
Patented Sep. 20, 1844.

UNITED STATES PATENT OFFICE.

JOSEPH K. SLATER AND SYLVANUS G. PRATT, OF BOSTON, MASSACHUSETTS.

HORSE-HAME.

Specification of Letters Patent No. 3,754, dated September 20, 1844.

*To all whom it may concern:*

Be it known that we, JOSEPH K. SLATER and SYLVANUS G. PRATT, of Boston, in the county of Suffolk and State of Massachusetts, have invented a new and useful improvement on the improvement of horse-hames patented by Nathan Post, of Madrid, in the State of New York, on or about the 15th day of June, A. D. 1844, and which the said Post denominates the "gaft-hook and lever-purchase hames," and that the following description and accompanying drawings taken in connection constitute a full and exact specification of the construction and operation of our invention.

Figure 2:
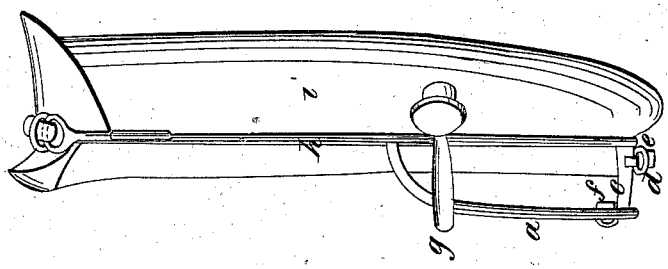
Figure 1:
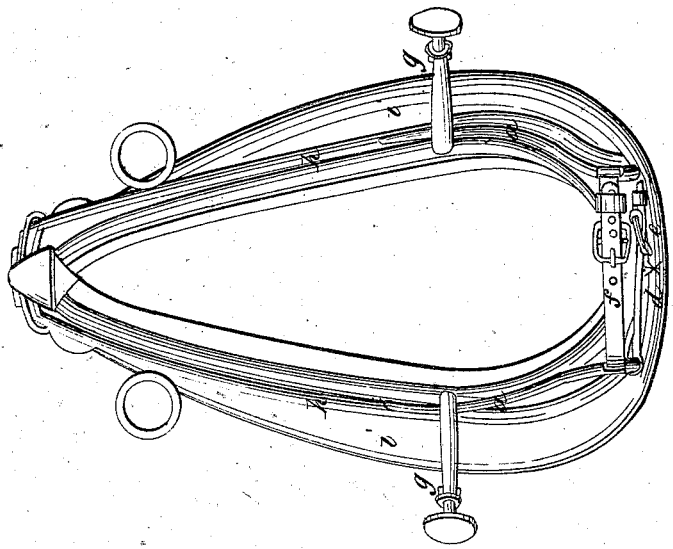

Figure 1, of the said drawings represents a front view of a pair of the said hames as applied to a harness collar, $h\ h$ being the hames and $i$ the collar. Fig. 2, is a side view of the same and the collar.

Our improvement, simple as it may appear on first examination, is productive of very important results.

It consists in extending each of the bearers or purchase bars $a\ a$, which spring from the middle of each hame $h$, downward as far as the lower end of the hame extends and uniting the said end of the bearer and end of the hame by an intervening connecting piece of metal $c$, or instead of connecting them in such manner, the bearer may be made of sufficient length and be bent at right angles and fastened at its end to the end of the hame. The lower ends of the hames are connected by straps or a strap $d$, having a buckle. The lower ends of bearers $a\ a$, are to be similarly connected by a strap $f$. By thus connecting the ends of the bearers and hames the strain of the gaft or purchase hook $g$ of each hame is brought to bear in a proper manner upon the lower end of each hame so as to press it down upon the collar and prevent it from rising therefrom as it often does when otherwise made, in the manner heretofore practised, besides the connections $c$, $c$ prevent the bearers from being broken off by the horse, when put into a stall or brought near a feeding trough, an accident which is constantly liable to occur when the lower ends of the bearers are not connected with those of the hames, by reason of the bearers catching upon the edge or side of the trough.

The hames of the said Nathan Post have been calculated for heavy draft, whereas ours is applicable to light draft.

For further information respecting the nature and principles of the invention of the said Nathan Post reference is to be had to the specification which accompanies his Letters Patent for the same.

Having thus explained our improvement we shall claim the same—that is to say:

Connecting the lower ends of the hames and bearers, substantially as set forth, and for the purposes as hereinbefore described.

In testimony that the above is a correct specification of our improvement we have hereto set our signatures this twentieth day of August A. D. 1844.

JOSEPH K. SLATER.
SYLVANUS G. PRATT.

Witnesses:
R. H. EDDY,
JOHN NOBLE.